United States Patent
Agapi et al.

(10) Patent No.: US 7,792,253 B2
(45) Date of Patent: Sep. 7, 2010

(54) COMMUNICATIONS INVOLVING DEVICES HAVING DIFFERENT COMMUNICATION MODES

(75) Inventors: Ciprian Agapi, Lake Worth, FL (US); Vanessa V. Michelini, Boca Raton, FL (US); Wallace J. Sadowski, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 11/260,829

(22) Filed: Oct. 27, 2005

(65) Prior Publication Data

US 2007/0116194 A1    May 24, 2007

(51) Int. Cl.
H04M 11/00    (2006.01)
(52) U.S. Cl. ............... 379/88.14; 379/88.01; 379/67.1; 370/352; 455/414.4
(58) Field of Classification Search .............. 370/389, 370/400, 401, 465, 466, 352; 455/418, 420, 455/414.4; 379/88.14, 88.01, 67.1
See application file for complete search history.

(56) References Cited

U.S. PATENT DOCUMENTS 6,636,587 B1 * 10/2003 Nagai et al. ............... 379/88.14

(Continued)

FOREIGN PATENT DOCUMENTS

JP    09-288413 A1    10/1997

OTHER PUBLICATIONS

Debbabi, M., et al., "The War of Presence and Instant Messaging: Right Protocols and APIs", In Proceedings of the IEEE Consumer Communications and Networking Conference, CCNC'2004, pp. 341-346, Las Vegas, Nevada, Jan. 5, 2004, IEEE Press.

(Continued)

Primary Examiner—Harry S Hong
Assistant Examiner—Antim Shah
(74) Attorney, Agent, or Firm—Patents On Demand, P.A.; Brian K. Buchheit

(57) ABSTRACT

The present invention includes a telecommunication method. The method can include the step of a sending device operating in a first communication mode initializing a communication to a receiving device operating in a second communication mode. The receiving device can be queried to automatically determine that the receiving device is operating in the second communication mode. In one embodiment, the first and second communication modes can include a speech mode and a text mode. The communication can be established between the sending and receiving devices, where the sending device communicates in the first communication mode, and where the receiving device communicates in the second communication mode. During the communication, a format of messages conveyed between the sending device and the receiving device can be automatically changed in accordance with the first communication mode and the second communication mode.

17 Claims, 3 Drawing Sheets

U.S. PATENT DOCUMENTS

| | | |
|---|---|---|
| 6,643,517 B1 | 11/2003 | Steer |
| 6,823,184 B1 | 11/2004 | Nelson |
| 7,224,774 B1 * | 5/2007 | Brown et al. ............. 379/88.14 |
| 7,286,649 B1 * | 10/2007 | Nelson et al. ................. 379/71 |
| 7,305,068 B2 * | 12/2007 | Tucker et al. ............ 379/88.11 |
| 2001/0016491 A1 | 8/2001 | Imura et al. |
| 2002/0059138 A1 | 5/2002 | Priest et al. |
| 2002/0071539 A1 * | 6/2002 | Diament et al. ........ 379/202.01 |
| 2003/0050096 A1 | 3/2003 | Heatley |
| 2003/0134626 A1 | 7/2003 | Himmel et al. |
| 2004/0059580 A1 * | 3/2004 | Michelson et al. ....... 704/270.1 |
| 2004/0203667 A1 | 10/2004 | Schroeder |
| 2005/0058267 A1 | 3/2005 | Martin |
| 2005/0232166 A1 * | 10/2005 | Nierhaus .................... 370/260 |
| 2006/0155814 A1 * | 7/2006 | Bennett et al. .............. 709/207 |

OTHER PUBLICATIONS

Niemi, M., et al., "Multi-party Instant Message (IM) Sessions Using the Message Session Relay Protocol (MSRP)", IETF Standard-Working Draft, Internet Engineering Task Force, IETF, CH, No. 3, Jul. 18, 2005.

PCT/EP2006/067449 International Search Report, Jan. 31, 2007.

* cited by examiner

COMMUNICATIONS INVOLVING DEVICES HAVING DIFFERENT COMMUNICATION MODES

BACKGROUND

1. Field of the Invention

The present invention relates to the field of communications and, more particularly, to communication devices having different communication modes, such as a text mode and a speech mode.

2. Description of the Related Art

Many communication devices have multiple communication modes, such as a text mode and a speech mode. There are times when one or more communication modes of a receiving device are disfavored or unavailable. For example, often voice communications and text messaging services for mobile phones are provided over different networks and one or the other of the networks can be unavailable for a particular area. Additionally, text messaging communication between a sending and receiving device may not be possible due to either the sending or receiving device not having subscribed to a text messaging service.

In another example, a mobile phone user may be in an environment where a particular communication mode is undesirable. In one instance, a speech mode can be undesirable because an environment of a receiving device is excessively noisy to the extent where it is difficult to hear a caller, such as at a concert. A speech mode can also be undesirable when the callee is in an environment where it is impolite for the callee to speak, such as when the callee is in a meeting, watching a movie, attending an opera, etc. Similarly a text mode can be undesirable in an excessively bright environment where text is difficult to read because of glare or in an environment where the callee cannot conveniently provide a text response, such as when the callee is driving.

Conventionally, the communication mode used for a receiving device is dependent upon the mode used by the calling device. For example, when a mobile telephone receives a call initialized in a speech mode, the mobile telephone accepts the call in a speech mode. When speech mode is disabled, a caller can be directed to leave a message in a voice mailbox of the caller. The callee is unaware of the content of a message until the callee accesses his/her voice mailbox and retrieves the message. This typically does not occur until some time after the callee moves out of the environment where the voice mode was disabled. Similarly, text messages are typically delayed until a recipient has moved from one environment to another. In both situations, this delay can negate the purpose of the message and can inconvenience the caller and/or the callee.

Another related shortcoming with conventional communication technologies is that devices having different communication modes are generally unable to communicate with each other. For example, a first user utilizing a computer based instant messaging application (text communication mode) is unable to establish communications with a user of a telephone device (speech communication mode). This limitation makes communications among individuals more difficult than is necessary.

What is needed is a new communication technology that permits communications among two or more people irrespective of the communication modes used at communication endpoints. Moreover, an ideal communication technology would permit a user of a device having multiple communication modes to establish and utilize a preferred communication mode; no matter what mode is used by communication devices of other communication participants.

SUMMARY OF THE INVENTION

The present invention permits communication devices operating in different communication modes to communicate with each other in accordance with an embodiment of the inventive arrangements disclosed herein. More specifically, the present invention can utilize a conversion element to convert messages between different formats used by different communication devices participating in a communication session. For example, a sending device operating in a speech mode can communicate with a receiving device operating in a text mode. The conversion element can perform text-to-speech (TTS) and speech-to-text (STT) conversion operations as well as converting messages from one messaging protocol to another.

In one embodiment, the sending and/or receiving communication devices can be communication devices having multiple communication modes. A preferred communication mode can be established for the devices through one or more user configurable settings. The communication mode through which the communication device operates can be based upon the preferred communication mode.

The present invention can be implemented in accordance with numerous aspects consistent with material presented herein. For example, one aspect of the present invention can include a telecommunication method. The method can include the step of a sending device operating in a first communication mode initializing a communication to a receiving device operating in a second communication mode. The receiving device can be queried to automatically determine that the receiving device is operating in the second communication mode. In one embodiment, the first and second communication modes can include a speech mode and a text mode. The communication can be established between the sending and receiving devices, where the sending device communicates in the first communication mode, and where the receiving device communicates in the second communication mode. During the communication, a format of messages conveyed between the sending device and the receiving device can be automatically changed in accordance with the first communication mode and the second communication mode.

Another aspect of the present invention includes a telecommunication method including a step of a caller, using a sending device operating in a speech mode, dialing a callee to initialize a telecommunications session. It can be automatically determined that a receiving device of the callee is set to operate in a text mode. A speech-to-text application can be automatically enabled to convert speech provided by the caller into text. The speech of the caller can be converted into text using the speech-to-text application. The converted text can be conveyed to the callee.

Still another aspect of the present invention includes a telecommunication system comprising a receiving device and a speech-to-text processor. The receiving device can have two or more communication modes. The communication modes can include a speech communication mode and a text communication mode. The receiving device can also include a user configurable setting for selecting a preferred communication mode. The speech-to-text processor can be configured to convert speech transmitted from a sending device into text, which is displayed upon the receiving device. The speech-to-text processor can be automatically allocated when (a) the user configurable setting is set to the text communication mode and (b) a sending device is communicatively linked to the receiving device. The speech-to-text processor can be automatically deallocated when it is not needed.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
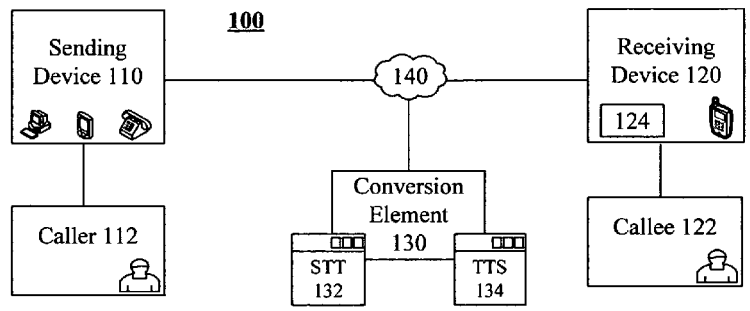
FIG. 1 is a schematic diagram for a telephony system permitting communications between a sending device and a receiving device, where each device operates in a different communication mode in accordance with an embodiment of the inventive arrangements disclosed herein.

FIG. 1 is a schematic diagram for a telephony system 100 permitting communications between a sending device and a receiving device, where each device operates in a different communication mode in accordance with an embodiment of the inventive arrangements disclosed herein. System 100 can include sending device 110 that is communicatively linked via network 140 to receiving device 120.

Network 140 can be configured to permit the conveyance of data that is encoded in a carrier wave. Network 140 can include a circuit based network, such as a Plain Old Telephone System (POTS) network, as well as a packet based network, such as an Internet. Network 140 can include wireless as well as line based communication pathways.

The sending device 110 and receiving device 120 can each be any message conveying device configured to convey messages over network 140 using a speech communication mode and/or a text communication mode. Speech communication mode devices can include telephones, mobile phones, Voice over Internet Protocol (VoIP) phones, radio transceivers, voice enabled computers, and other such devices. Text communication mode devices can include smart phones, personal data assistants (PDAs), computers, text pagers, and the like.

The sending device 110 can operate in a different communication mode than the receiving device 120. Different communication modes can utilize different communication networks, protocols, input devices, output devices, and the like. Different speech communication modes can include, a telephone mode, a VoIP calling mode, a radio communications mode, and a mode for receiving/conveying encoded audio files, a media streaming mode, and the like. Different text modes can include text messaging, instant messaging, e-mail, text based Web browsing, a mode for receiving/conveying encoded text messages, and the like.

The sending device 110 and/or the receiving device 120 can each have multiple communication modes. Different ones of these communication modes (e.g. a text mode and a speech mode) can be mutually exclusive so that only one can be utilized at any one time. Additionally, an owner of the sending device 110 and/or the receiving device 120 may have to subscribe to different services to utilize one or more of the communication modes, which the device is capable of handling.

Sending device 110 and/or receiving device 120 can include at least one user configurable setting 124 relating to a preferred communication mode. A preferred communication mode is defined as a mode with which a user wishes to communicate. The preferred mode does not have to match the mode used by other devices involved in a communication.

In one embodiment, a default communication setting can match the communication mode of the receiving device 120 with the communication mode of a sending device 110, when possible. The default mode can alternatively be set for a particular communication mode, such as a speech mode, regardless of the communication mode of other devices involved in a communication.

Configurable settings 124 can be combined with other device settings so that a single user selection can change multiple aspects of the device. For example, a quiet setting can establish a text communication mode and can additionally cause the phone to vibrate when receiving incoming communications.

Configurable settings 124 can also be associated with events of one or more applications that can be local or remotely located from the communication device. For example, different settings 124 can be associated with a calendar application that tracks appointments for caller 112 and/or callee 122. Consequently, when the calendar program indicates a meeting or that caller 112 and/or callee 122 is for some reason unable to communicate using the sending device 110 and/or the receiving device 120 in a speech communication mode, settings 124 can be dynamically adjusted to a text communication mode for those periods. The configurable settings 124 can be re-adjusted to their original settings once the event noted by the calendaring program has passed.

In one contemplated embodiment, both the sending device 110 and the receiving device 120 can be devices having multiple possible communication modes. The sending device 110 can include configurable settings (not shown) established by caller 112. The receiving device 120 can include configurable settings 124 established by callee 122. Here, the sending device 110 can automatically negotiate with the receiving device 120 to determine and to subsequently establish a mutually beneficial communication. For example, caller 112 can prefer a speech communication mode over a text communication mode when callee 122 is able also communicate through speech, but can prefer to communicate using a text communication mode with the callee 122, otherwise. That is, caller 112 can prefer speech communication over text, but would rather communicate via text instead of communicating with callee 122 using different communication modes.

Because the caller 112 and the callee 122 can establish a communication where each communicates with a different communication mode, a conversion element 130 can be automatically enabled to handle format and protocol conversions. The conversion element 130 can include speech-to-text (STT) processor 132 and a text-to-speech (TTS) processor 134. Therefore, caller 112 can speak into sending device 110, the speech can be converted to text using STT processor 132, and presented as text in a viewing window of receiving device 120. Callee 122 can type a response in receiving device 120, the response can be converted to speech using TTS processor 134, and the speech can be presented to caller 112 via sending device 110.

Conversion elements 130 are shown as network elements remotely located from sending device 110 and/or receiving device 120. The network elements can be elements of a telephony environment that are selectively enabled for a communication as needed. The invention is not to be construed as limited in this regard, however, and other arrangements are contemplated.

For example, the conversation element 130 can be locally connected to or embedded within sending device 110 and/or receiving device 120. The conversion element 130 can perform the TTS, STT, and protocol conversions necessary to communicate in a different communication mode. The communication mode of receiving device 120 (or sending device 110) can appear different to the callee 122 (or callee 112) and to the network 140, since all necessary conversions are performed internally.

Figure 2:
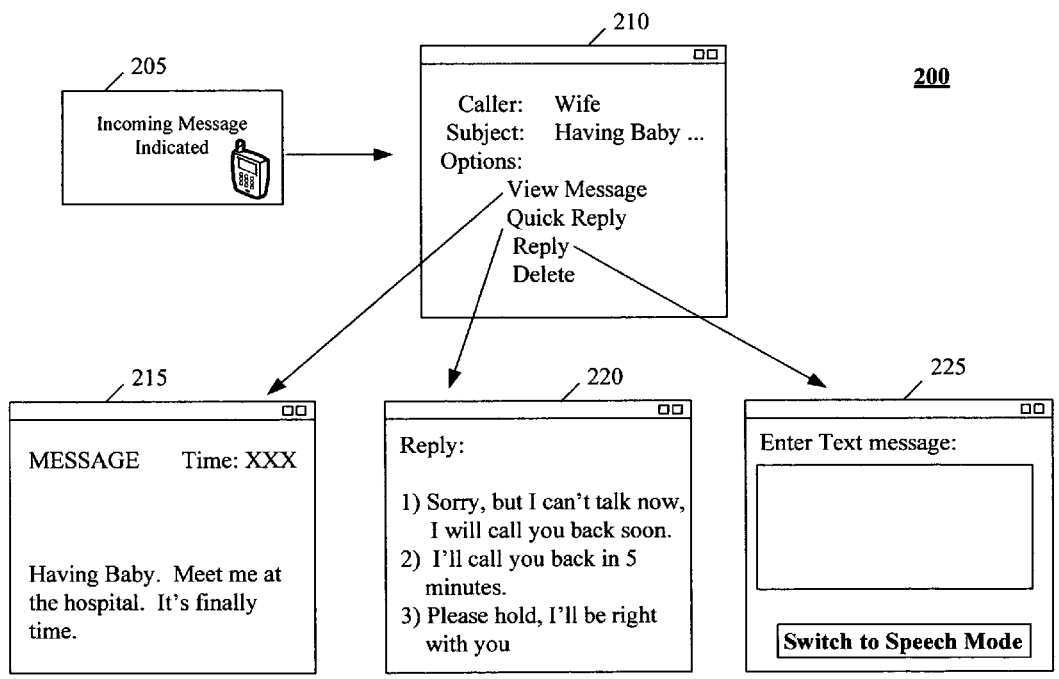
FIG. 2 is a schematic diagram illustrating a recipient interaction in accordance with an embodiment of the illustrative arrangements disclosed herein.

FIG. 2 is a schematic diagram illustrating a recipient interaction 200 in accordance with an embodiment of the illustrative arrangements disclosed herein. Interaction 200 can occur in the context of a communication involving a receiving device capable of interfacing in both a text communication mode and in a speech communication mode, such as a communication including receiving device 120. For purposes of interaction 200, it is assumed that a caller using a speech communication mode is attempting to contact a receiving device configured for a text communication mode. It should be appreciated that although interaction 200 is illustrated for a receiving device, an equivalent interaction is contemplated for a sending device.

Interaction 200 can begin at step 205 when the receiving device receives a voice call and indicates the incoming call by a previously established means, such as vibrating, ringing, or blinking. The caller can speak a message that is automatically converted into a text message. The text message can appear within display 210 of the receiving device.

Unlike traditional communications, where the caller is leaving a message to a previously established offline message store, the caller can actively communicate with the callee who is receiving a text message of the speech input in real-time. Also unlike traditional messages, the callee can instantly receive a preview of the call and can choose an appropriate response based upon the message. Conventionally, the callee would not know the content of a message until the callee accessed voice mail or enabled some other message retrieval service.

In interaction 200, display 210 can show that the caller is the recipient's wife and a message beginning "having baby" can appear. From here, the callee can select multiple responses. The callee can, for example, select to view the full message, which would display message window 215. The callee can also elect to respond immediately via text through either a quick reply or a full reply.

A quick reply, shown by display 220, can include a number of general or user configured responses that can be selected. A selected response can be immediately text-to-speech converted and conveyed to the caller, who will hear the selected message immediately as a speech response.

Display 225 shows a full reply where a callee can type or write a response. Additionally, an option to change conversion modes can be selected. For example, a switch to speech mode option can be included in display 225. The recipient (as well as the sender) can change conversation modes without interrupting or terminating a communication. It is contemplated that a callee (or caller) can shift from a text mode to a speech mode regardless of the communication mode used by the caller (or callee).

Figure 3:
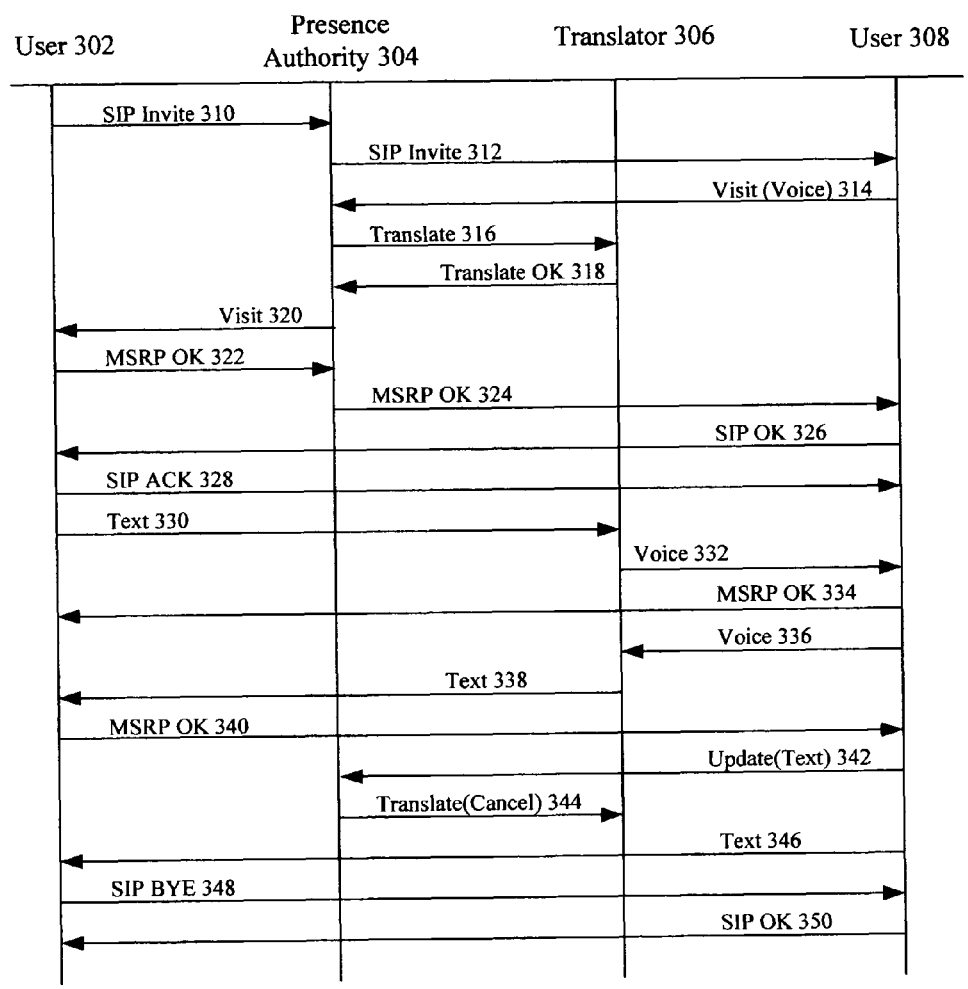
FIG. 3 is a flow diagram showing a communication between two different users, one using a speech communication mode and the other a text communication mode, in accordance with an embodiment of the inventive arrangements disclosed herein.

FIG. 3 is a flow diagram 300 showing a communication between two different users, one using a speech communication mode and the other a text communication mode, in accordance with an embodiment of the inventive arrangements disclosed herein. Diagram 300 can be performed in the context of a Session Initiation Protocol (SIP) based communication. More specifically, the diagram 300 is based upon an extension of a SIP for Instant Messaging and Presence Leveraging Extensions (SIMPLE) based protocol that allows for multimedia translations.

Diagram 300 shows an exchange of messages between user 302, user 308, presence authority 304, and translator 306. User 302 and user 308 each represent a communication node. Specifically, user 302 represents a calling node communicating through text. User 308 represents a called node communicating through voice or speech.

In diagram 300, user 302 can send an invite message 310 to presence authority 304. The invite message 310 can include Uniform Research Identifiers (URIs) for both user 302 and user 308 as well as a preferred communication type. For example, message 310 can include "SIP INVITE (SenderURI, Text, ReceiverURI)". Presence authority 304 can convey the invite message 312 to user 308. The invite message 312 can be a standard SIP invite message, such as "SIP INVITE (SenderURI)". User 308 can respond to the invite message with a voice preference, as shown by message 314, which could be formatted "MSRP VISIT (Voice)". The MSRP VISIT message can be a Message Session Relay Protocol (MSRP) message.

Presence authority 304 can send information about the communication preferences and the URI's of the parties that want to communicate to translator 306, which can represent a translator service. For example, a translate message 316, such as "TRANSLATE (SenderURI, Text, ReceiverURI, Voice)", can be sent to translator 306. Translator 306 can dynamically allocate resources responsive to receiving message 316. These resources can be acquired during and for the communication session. After the translation resources are allocated, translator 306 can convey an OK message 318 that includes the URIs for the allocated translators. For example, one URI for a text translator and one for a voice translator can be conveyed. Message 318 can be formatted as "OK (TextTranslatorURI, VoiceTranslatorURI).

A visit message 320 including the URI of the text translator can be conveyed from presence authority 304 to user 302. Message 320 can include "MSRP VISIT (TextTranslatorURI). In response, a MRSP OK message 322 can be conveyed from user 302 to presence authority 304. Presence authority 304 can convey the URI for the voice translator to user 308, as shown by message 324. Message 324 can include "MSRP OK (VoiceTranslatorURI). User 308 can then convey SIP OK message 326 to user 302. User 302 can acknowledge by sending SIP ACK message 328 to user 308. At this point, the handshake is complete and all necessary resources are acquired for the communication session.

User 302 can then send text 330 to translator 306, such as through a "MSRP SEND (TEXT)" message. Translator 306 can translate the text and send the translation to user 308 as voice message 332. A format for message 332 can include "MSRP SEND (VOICE)". User 308 can send a MSRP OK message 334 to user 302. User 308 can then send voice message 336 to translator 306. Translator 306 can translate the voice to text and sent it to user 302 as message 338. User 302 can convey MSRP OK message 340 to user 308.

User 308 can then change a communication preference from speech to text. This notification can occur within the SIP communication session. For example, an update (TEXT) message can be conveyed from user 308 to presence authority 304. Presence authority 304 can decommission the translation resources for the session. For example, presence authority 304 can convey translate (Cancel) message 344 to translator 306.

User 308 can then send text message 346 to user 302. Text messages can be exchanged between user 302 and 308 for the remainder of the SIP session without involving the translator 306. The SIP session can terminate when user 302 sends SIP BYE message 348 to user 308, followed by a SIP OK message 350.

It should be appreciated that diagram 300 is shown for illustrative purposes and the invention is not to be construed as limited to an implementation based upon any particular protocol. That is, diagram 300 shows one implementation example for a SIP based communication, which one of ordinary skill in the art can modify to implement the invention described herein using any communication protocol. Additionally, it should be apparent to one of ordinary skill in the art that either user 302 and/or user 308 can alter a communication mode during a communication session.

Figure 4:
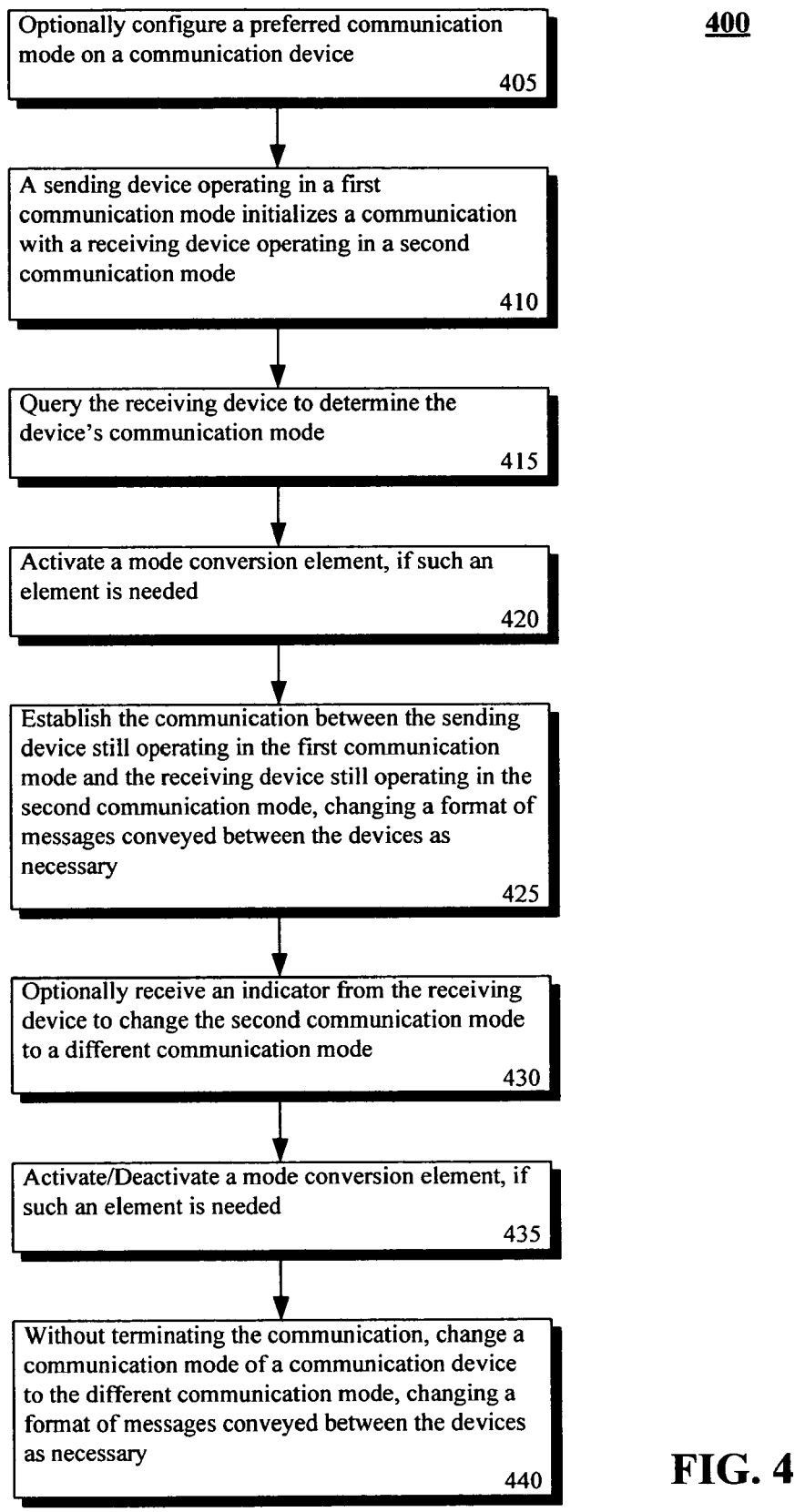
FIG. 4 is a flow chart of a telecommunication method where a sending device and a receiving device communicate while operating in different communication modes in accordance with an embodiment of the inventive arrangements disclosed herein.

FIG. 4 is a flow chart of a telecommunication method 400 where a sending device and a receiving device communicate while operating in different communication modes in accordance with an embodiment of the inventive arrangements disclosed herein. Method 400 can be performed in the context of a communication, where a sending device communicates with a receiving device. For example, method 400 can be performed in the context of system 100. One or more of the sending/receiving devices can have two or more communication modes. Communication modes for the communication devices can include a speech mode and/or a text mode.

Method 400 can begin in optional step 405, where a preferred communication mode can be configured for a communication device. For example, the communication device can be a mobile telephone and the user can configure a communication mode setting. A preferred communication mode is only established for a sending/receiving device that has more than one available communication mode.

In step 410, a sending device operating in a first communication mode can initialize a communication with the receiving device operating in a second communication mode. In step 415, the receiving device can be queried to determine that the receiving device is to operate in the second communication mode. In step 420, if the first communication mode and the second communication mode are different, a mode conversion element may be necessary. In such a case, one or more mode conversion elements can be automatically activated and/or allocated as needed.

For example, if the first communication mode is a speech mode and the second communication mode is a text mode, then a speech-to-text processor may be required to convert speech input provided to the sending device into text presented upon the receiving device. Similarly, a text-to-speech processor may be required to convert text input provided to the receiving device into speech presented upon the sending device.

In step 425, a communication can be established between the sending device still operating in the first communication mode and the receiving device still operating in the second communication mode. A format of messages conveyed between the sending and receiving device can be changed as necessary.

During the communication, a user of the sending and/or receiving device is able to change the communication mode without terminating the communication session. That is, in optional step 430, an indicator can be received from one of the communication devices to change a communication mode of that device. In step 435, a mode conversion element can be activated/deactivated or allocated/deallocated as necessary. In step 440, a communication mode of a communication device can be changed from an original communication mode to a different communication mode. The format of messages conveyed between devices can be changed so that messages are now formatted for the different communication mode and not for the original communication mode.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A telecommunication method comprising:
a sending device operating in a first communication mode initializing a communication to a receiving device, wherein said first communication mode is a speech mode communication;
querying the receiving device from a network node functioning as a communication intermediary between the sending device and the receiving device, where the network node is a node remotely located from the sending device and the receiving device that is connected to each via a network, wherein the querying is via a Session Initiation Protocol (SIP) based message to determine a communication mode of the receiving device;
receiving a response at the network node to the querying via another SIP based message from the receiving device, wherein the another SIP based message comprises semantic content provided by the receiving device, said semantic content defining a communication mode to be used for the receiving device;

determining from the semantic content of the another SIP based message that the receiving device is operating in the second communication mode, and wherein said second communication mode is a text mode;

responsive to said querying step, establishing said communication, wherein said sending device communicates in said first communication mode by conveying messages to a network in the first communication mode, and wherein said receiving device communicates in said second communication mode by conveying messages to the network in the second communication mode:

activating, via the network node, a speech-to-text conversion processor and a text-to-speech conversion processor of a conversion element, where the conversion element is remotely located from the sending device and the receiving device and is connected to each via the network;

during said communication, automatically changing a format of messages conveyed between the sending device and the receiving device in accordance with the first communication mode and the second communication mode, wherein automatically changing the format is performed by the conversion element, wherein the changing of the format of messages includes speech-to-text converting a portion of the messages and text-to-speech converting a portion of the messages;

during said communication, the receiving device sending a different SIP based message to the network node, wherein the SIP based message includes semantic content indicating that the second communication mode is to be changed to a voice mode; and responsive to receiving the different SIP based message, the network node deactivating the conversion element for the communication so that it no longer performs speech-to-text and text-to-speech conversions of messages conveyed between the sending device and the receiving device during the communication, altering said communication so that the receiving device communicates in speech mode, wherein the altering of the second communication mode occurs without terminating said communication.

2. The method of claim 1, wherein the another SIP based message and the different SIP based message use an extended version of the SIP protocol that is in accordance with an extension of a SIP for Instant Messaging and Presence Leveraging Extensions (SIMPLE) based protocol.

3. The method of claim 1, further comprising:
associating a configurable setting of the receiving device so that application events are detected and used to automatically and dynamically adjust a setting of the second communication mode to change the second communication mode between the text mode and the voice mode.

4. The method of claim 3 wherein the application that produces at least one of the application events is one that runs remotely from the receiving communication device.

5. The method of claim 3, wherein the application that produces at least one of the application events maintains a schedule for a user of the receiving device, wherein text mode is automatically established as the secondary communication mode for the receiving device when a schedule of the user indicates that the user is in a meeting, and wherein when the schedule of the user indicates that the user is finished with a meeting, voice mode is automatically established as the secondary communication mode for the receiving device.

6. The method of claim 1, wherein the first communication mode that the sender is operating in a voice communication mode, wherein the second communication mode that the receiving device is operating within is a text communication mode, wherein said receiving device displays in text a subject of the communication comprising semantic content speech-to-text converted from content sent via the sending device, wherein an interface of the receiving device provides an option to switch to speech mode, wherein the changing of the format of messages occurs responsive to a selection of the option by a user of the receiving device, wherein said different communication mode is a speech communication mode.

7. The method of claim 1, wherein during the querying of the receiving device, a session initiating SIP invite message is sent to the receiving device, the receiving device sends back an indicator of the second communication mode, and thereafter establishes the communication with the receiving device via a Message Session Relay Protocol (MSRP) OK message.

8. The method of claim 1, the sending and receiving device each lack a text-to-speech processor and lack a speech-to-text processor.

9. The method of claim 1, wherein the receiving device has a plurality of communication modes and is a mobile phone having a screen for displaying text, wherein said plurality of communication modes comprise at least one speech mode and at least one text mode.

10. The method of claim 1, wherein said conversion element provides a translation service for the network node.

11. The method of claim 1, wherein said steps of claim 1 are performed by at least one machine in accordance with at least one computer program having a plurality of code sections that are executable by the at least one machine.

12. A computer program product comprising a computer readable storage medium having computer usable program code embodied therewith, the computer usable program code comprising:
computer usable program code stored in a tangible storage medium, when said computer usable program code is executed by a processor it is operable to initialize, from a sending device operating in a first communication mode, a communication to a receiving device, wherein said first communication mode is a speech mode communication;

computer usable program code stored in a tangible storage medium, when said computer usable program code is executed by a processor it is operable to query the receiving device from a network node functioning as a communication intermediary between the sending device and the receiving device, where the network node is a node remotely located from the sending device and the receiving device that is connected to each via a network, wherein the querying is via a Session Initiation Protocol (SIP) based message to determine a communication mode of the receiving device;

computer usable program code stored in a tangible storage medium, when said computer usable program code is executed by a processor it is operable to receive a response at the network node to the querying via another SIP based message from the receiving device, wherein the another SIP based message comprises semantic content provided by the receiving device, said semantic content defining a communication mode to be used for the receiving device;

computer usable program code stored in a tangible storage medium, when said computer usable program code is executed by a processor it is operable to determine from the semantic content of the another SIP based message that the receiving device is operating in the second communication mode, and wherein said second communication mode is a text mode;

computer usable program code stored in a tangible storage medium, when said computer usable program code is executed by a processor it is operable to, responsive to querying the receiving device, establish said communication, wherein said sending device communicates in said first communication mode by conveying messages to a network in the first communication mode, and wherein said receiving device communicates in said second communication mode by conveying messages to the network in the second communication mode; computer usable program code stored in a tangible storage medium, when said computer usable program code is executed by a processor it is operable to activate, via the network node, a speech-to-text conversion processor and a text-to-speech conversion processor of a conversion element, where the conversion element is remotely located from the sending device and the receiving device and is connected to each via the network;

computer usable program code stored in a tangible storage medium, when said computer usable program code is executed by a processor it is operable to, during said communication, automatically change a format of messages conveyed between the sending device and the receiving device in accordance with the first communication mode and the second communication mode, wherein automatically changing the format is performed by the conversion element, wherein the changing of the format of messages includes speech-to-text converting a portion of the messages and text-to-speech converting a portion of the messages;

computer usable program code stored in a tangible storage medium, when said computer usable program code is executed by a processor it is operable to during said communication, send from the receiving device a different SIP based message to the network node, wherein the SIP based message includes semantic content indicating that the second communication mode is to be changed to a voice mode; and computer usable program code stored in a tangible storage medium, when said computer usable program code is executed by a processor it is operable to responsive to receiving the different SIP based message, deactivating at the network node the conversion element for the communication so that it no longer performs speech-to-text and text-to-speech conversions of messages conveyed between the sending device and the receiving device during the communication, altering said communication so that the receiving device communicates in speech mode, wherein the altering of the second communication mode occurs without terminating said communication.

13. The computer program product of claim 12, wherein during the querying of the receiving device, a session initiating SIP invite message is sent to the receiving device, the receiving device sends back an indicator of the second communication mode, and thereafter establishes the communication with the receiving device via a Message Session Relay Protocol (MSRP) OK message.

14. A telecommunication method comprising:

a network node receiving a communication from a sending device to a receiving device, wherein the receiving device is operating in a first communication mode that is a speech communication;

querying the receiving device from the network node functioning as a communication intermediary between the sending device and the receiving device, where the network node is a node remotely located from the sending device and the receiving device that is connected to each via a network, wherein the querying is via a Session Initiation Protocol(SIP) based message to determine a communication mode of the receiving device;

receiving a response at the network node to the querying via another SIP based message from the receiving device, wherein the another SIP based message comprises semantic content provided by the receiving device, said semantic content defining a communication mode to be used for the receiving device;

determining from the semantic content of the another SIP based message that the receiving device is operating in the second communication mode, and wherein said second communication mode is a text mode;

responsive to said querying step, establishing said communication, wherein said sending device communicates in said first communication mode by conveying messages to a network in the first communication mode, and wherein said receiving device communicates in said second communication mode by conveying messages to the network in the second communication mode;

activating, via the network node, a speech-to-text conversion processor and a text-to-speech conversion processor of a conversion element, where the conversion element is remotely located from the sending device and the receiving device and is connected to each via the network;

during said communication, automatically changing a format of messages conveyed between the sending device and the receiving device in accordance with the first communication mode and the second communication mode, wherein automatically changing the format is performed by the conversion element, wherein the changing of the format of messages includes speech-to-text converting a portion of the messages and text-to-speech converting a portion of the messages;

during said communication, the network node receiving a different SIP based message from the receiving device, wherein the SIP based message includes semantic content indicating that the second communication mode is to be changed to a voice mode; and responsive to receiving the different SIP based message, the network node deactivating the conversion element for the communication so that it no longer performs speech-to-text and text-to-speech conversions of messages conveyed between the sending device and the receiving device during the communication, altering said communication so that the receiving device communicates in speech mode, wherein the altering of the second communication mode occurs without terminating said communication.

15. The method of claim 14, wherein the network node comprises at least one computer program product, said at least one computer program product comprising a computer readable storage medium having computer usable program code embodied therewith, the computer usable program code comprising computer usable program code stored in a tangible storage medium, when said computer usable program code is executed by a processor it is operable to perform said receiving of the communication, said querying, said receiving of the response, said determining, said establishing, said activating, said changing, said receiving of the different SIP based message, and said deactivating.

16. The method of claim 14, wherein the another SIP based message and the different SIP based message use an extended version of the SIP protocol that is in accordance with an extension of a SIP for Instant Messaging and Presence Leveraging Extensions (SIMPLE) based protocol.

17. The method of claim 14, wherein during the querying of the receiving device, a session initiating SIP invite message is sent to the receiving device, the receiving device sends back an indicator of the second communication mode, and thereafter establishes the communication with the receiving device via a Message Session Relay Protocol (MSRP) OK message.

\* \* \* \* \*